(12) United States Patent
Hsiao

(10) Patent No.: US 8,166,502 B2
(45) Date of Patent: Apr. 24, 2012

(54) DOWNLOADING TV CHANNEL MAP BASED ON LOCATION AND PROVIDER

(75) Inventor: Eric Hsiao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 495 days.

(21) Appl. No.: 12/388,920

(22) Filed: Feb. 19, 2009

(65) Prior Publication Data

US 2010/0211978 A1    Aug. 19, 2010

(51) Int. Cl.
G06F 3/00 (2006.01)
G06F 13/00 (2006.01)
H04N 5/445 (2011.01)

(52) U.S. Cl. .......... 725/38; 725/39; 725/48; 725/51; 725/54

(58) Field of Classification Search .......... None
See application file for complete search history.

(56) References Cited

U.S. PATENT DOCUMENTS

| | | | |
|---|---|---|---|
| 5,673,205 A | | 9/1997 | Brunson |
| 5,748,732 A | | 5/1998 | Le Berre et al. |
| 6,219,839 B1 | | 4/2001 | Sampsell |
| 6,388,714 B1 | | 5/2002 | Schein et al. |
| 6,490,001 B1 * | | 12/2002 | Shintani et al. .......... 348/554 |
| 6,745,223 B1 | | 6/2004 | Nobakht et al. |
| 7,010,804 B2 | | 3/2006 | Shintani et al. |
| 7,100,186 B1 * | | 8/2006 | Minakawa et al. .......... 725/59 |
| 7,152,236 B1 * | | 12/2006 | Wugofski et al. .......... 725/40 |
| 2001/0011953 A1 | | 8/2001 | Shintani et al. |
| 2001/0027558 A1 | | 10/2001 | Sasselli et al. |
| 2002/0059366 A1 | | 5/2002 | Yap |
| 2002/0087984 A1 | | 7/2002 | Maeda et al. |
| 2002/0140871 A1 | | 10/2002 | Piotrowski et al. |
| 2003/0028883 A1 | | 2/2003 | Billmaier et al. |
| 2003/0066085 A1 * | | 4/2003 | Boyer et al. .......... 725/104 |
| 2003/0088780 A1 | | 5/2003 | Kuo et al. |
| 2003/0110498 A1 | | 6/2003 | Stone |
| 2003/0140343 A1 * | | 7/2003 | Falvo et al. .......... 725/51 |
| 2004/0128389 A1 | | 7/2004 | Kopchik |
| 2004/0172366 A1 | | 9/2004 | Muto et al. |
| 2006/0117375 A1 | | 6/2006 | Shintani |
| 2008/0046945 A1 | | 2/2008 | Hanley |

FOREIGN PATENT DOCUMENTS

| | | |
|---|---|---|
| EP | 1185097 | 6/2002 |
| JP | 09312550 | 2/1997 |
| JP | 10257402 | 9/1998 |
| JP | 2008124857 | 5/2008 |
| KR | 20020042454 | 6/2002 |
| KR | 20040064989 | 7/2004 |
| KR | 20080064264 | 7/2008 |
| WO | 2004095220 | 11/2004 |

* cited by examiner

*Primary Examiner* — Mark D Featherstone
(74) *Attorney, Agent, or Firm* — John L. Rogitz

(57) ABSTRACT

A network-enabled TV sends a geographic location to an Internet server and in response receives back a list of TV service providers for the location. A user selects a provider and the server in response downloads the channel map pertaining to the selected provider.

17 Claims, 2 Drawing Sheets

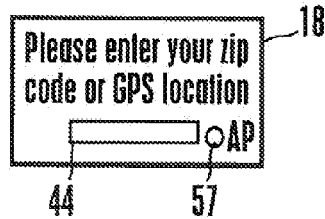
FIG. 3
geographic location GUI
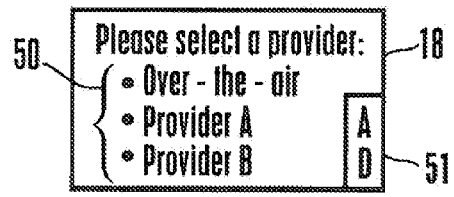
FIG. 4
provider GUI
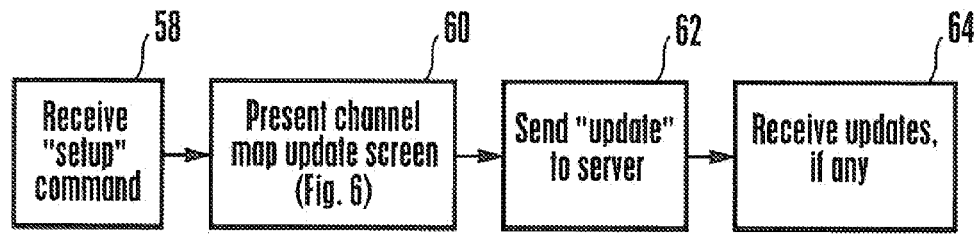
FIG. 5  update logic
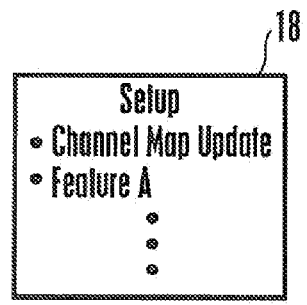
FIG. 6
update GUI
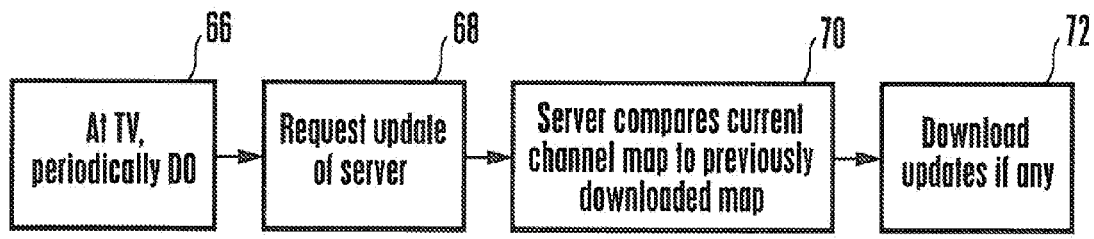
FIG. 7  alternate update logic
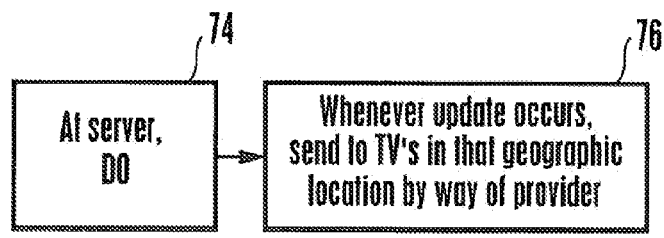
FIG. 8
alternate
update logic

DOWNLOADING TV CHANNEL MAP BASED ON LOCATION AND PROVIDER

FIELD OF THE INVENTION

The present invention relates generally to programming a TV with a channel map.

BACKGROUND OF THE INVENTION

When a customer first sets up a new TV or moves from one area to another, he has to initiate a autoprogramming scan for channels, which can take upwards of thirty minutes. Specifically, setting up a TV, using its own tuner as opposed to using an external cable or satellite set-top box, requires a time-consuming process which searches the input signal (typically a coaxial cable for cable TV customers) to create an internal database called a channel map that it will use for tuning. Even with optimizations to the algorithm for autoprogramming, an inordinate amount of time is still required.

SUMMARY OF THE INVENTION

Accordingly, as understood herein, with an internet connected television, a channel map can be acquired from a network server, bypassing the need to autoprogram. The network server maintains a list of channel map tuning data for geographical areas, and for those areas without map data, conventional autoprogramming can be done.

Accordingly, a TV executes logic that includes presenting a prompt on a TV for a user to input information representing geographic area for which a channel map is desired into a TV. The logic also includes receiving the information at the TV and transmitting the information to a network server. The information is correlatable to a list of TV signal providers. The logic also includes receiving, at the TV, the list from the network server, presenting the list on the TV, receiving a user selection of a TV signal provider on the list, and sending the user selection to the network server. The TV receives from the network server a channel map associated with both the user selection of a TV signal provider and the geographic area.

In example embodiments the TV can receive an update to the channel map. The update may be received in response to an update command entered into the TV and sent to the server. Or, the update can be received in response to an automatically generated update query sent from the TV to the server. Yet again, the update may be received automatically by the TV from the server without an update query or update command being sent from the TV to the server.

If desired, the prompt for a user to input information representing geographic area may be presented only upon a determination that the TV communicates with the server, and otherwise an autoprogram operation is executed. A user of the TV can be allowed to interrupt a process of receiving a channel map from a server and cause an autoprogram operation to be executed.

In another aspect, a network server executes logic including receiving from a TV over a network a location of the TV, downloading a channel map based on the location, and subsequently providing updated channel map information to the TV.

In another aspect, a network-enabled TV has a TV processor that can send a geographic location to an Internet server and in response receives back a list of TV service providers for the location. A TV display controlled by the TV processor displays the list. A user input device is manipulable by a person to select a provider from the list to thereby generate a select signal, which is sent from the TV to the server. A tangible data storage medium is accessible to the processor. The processor stores on the storage medium channel map information received from the server in response to the select signal.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a screen shot of the geographic location input graphical user interface (GUI);

FIG. 4 is a screen shot of the TV service provider GUI;

FIG. 5 is a flow chart of an example implementation of the channel map update logic; and FIG. 6 is a screen shot of an update user interface, and FIGS. 7 and 8 are flow charts of alternate channel map update logic.

DETAILED DESCRIPTION OF THE PREFERRED EMBODIMENT

As described in greater detail below, an internet-connected TV has the ability to download a channel map database from a network server provided by a TV manufacturer or by another entity. The channel map corresponds to the customer's geographic area and TV service provider (such as a cable company). The TV subsequently uses this channel map for all its tuning activities, since the example channel map includes tuner-related data such as frequency, physical and virtual channel mappings, and modulation. The channel map is comparatively small and can be downloaded in only a few seconds using, e.g., a digital subscriber line (DSL) connection, thus avoiding the need to perform a more prolonged autoprogram operation.

Figure 1:
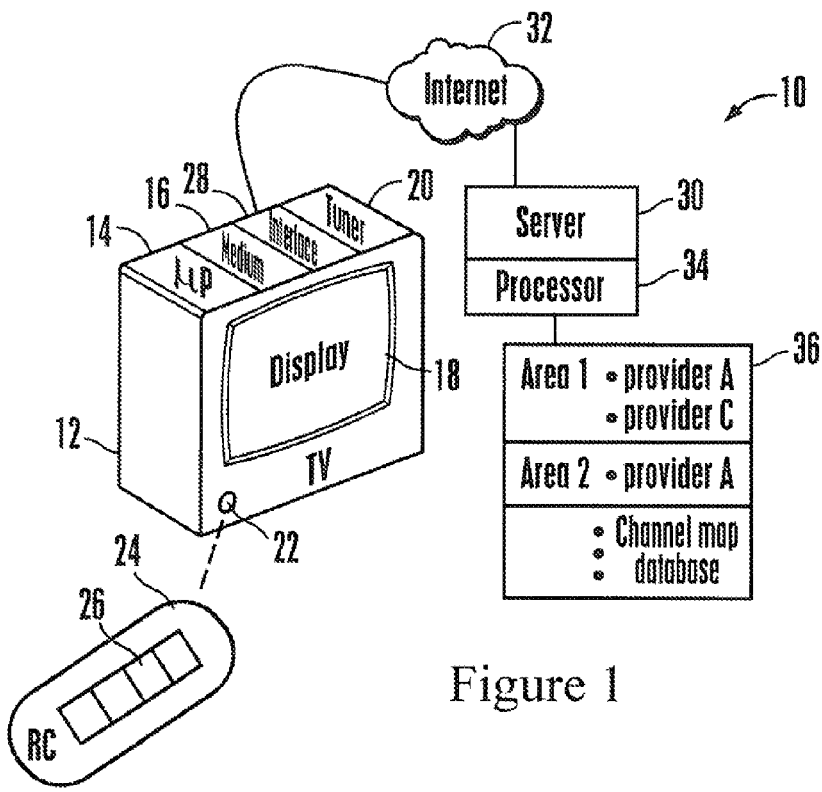
FIG. 1 is a block diagram of an example system in accordance with present principles, schematically showing internal components of the TV.

Accordingly, referring initially to FIG. 1, a system is shown, generally designated 10, which includes a TV 12 having a TV processor 14 accessing a computer readable storage medium 16 such as but not limited to solid state storage and/or disk-based storage to present TV signals on a TV display 18, such as a flat panel LCD display or other type of matrix display or a plasma display or other suitable type of TV display. The signals are received through a TV tuner 20 that communicate with a suitable source of TV signals.

The TV 12 typically includes a wireless receiver 22 such as an infrared receiver for receiving user command signals from a remote control 24. The remote control 24 typically includes one or more manipulable input elements 26 such as keys for enabling a user to input commands to the TV processor 14.

As shown in FIG. 1, the TV 12 also includes a network interface 28 such as but not limited to a wired or wireless modem for enabling the TV processor 14 to communicate with one or more channel map servers 30 over a wide area network such as the Internet 32. The network interface 28 may be incorporated within the chassis of the TV 12 or it may be included in a set-top box or set-back box operably engaged with the TV 12.

In any case, the server 30 includes one or more server processors 34 accessing a server data storage medium 36. As described in greater detail below, the example storage medium 36, which may include disk and/or solid state storage, contains a database of channel maps grouped by geographic area, with each area typically being associated with at least one and generally plural TV service providers. As channel map can be provided for each service provider in each area.

Figure 2:
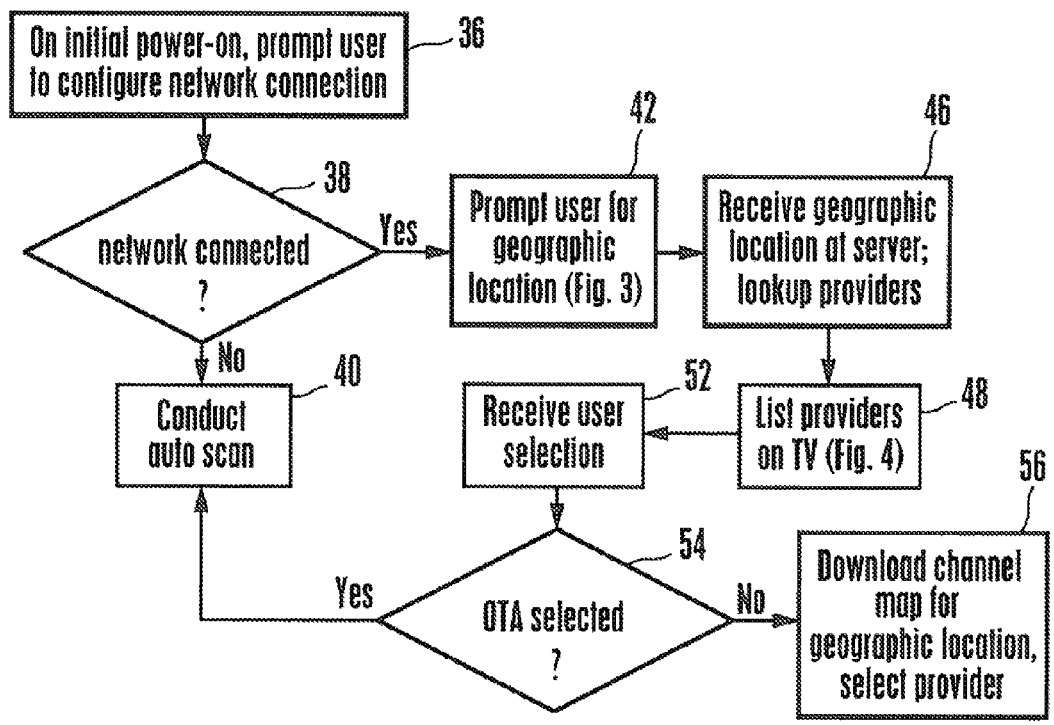
FIG. 2 is a flow chart of the initial power-on logic for obtaining a channel map.

Now referring to FIG. 2, on initial power-on of the TV at block 36, in some implementations the initial user prompt is to configure a network connection. If no network is available at decision diamond 38 as indicated by, e.g., the user entering "none" or after a time-out period, the logic flows to block 40 to conduct an autoscan of available channels, with or without user prompt.

On the other hand, once it is determined that a network connection has been established between the TV 12 and Internet 32, the logic flows to block 42 to prompt the user to enter the geographic location of the TV. An example GUI of this is shown in FIG. 3, which illustrates the text of an example user prompt and a field 44 into which the user may enter, e.g., a zip code, postal code, geographic coordinates, etc. using, for example, the remote control 24. As to the latter mode of location entry, the user may enter the latitude and longitude using, e.g., the remote control 24, or the user may be afforded the opportunity to establish a connection such as a universal serial bus (USB) link or consumer electronics control (CEC) link between the TV 12 and a geographic position satellite (GPS) receiver, to download the geographic location information directly from the receiver to the TV 12.

Once the geographic location information is entered into the TV 12, the TV 12 uploads the information to the server 30, which receives the information at block 46. The server 30 then accesses the channel map database to look up the available TV service providers in the entered location. This list is returned to the TV 12 and displayed thereon at block 48.

FIG. 4 shows an example list 50 that includes two service providers "A" and "B" and the default of "over the air" (OTA), meaning that no provider is selected and instead the TV will receive free broadcast signals from, e.g., a terrestrial TV signal antenna. Also, as shown at 51 an advertisement of one or more of the listed service providers may be provided and if the advertised provider is selected, a billing event is generated from which the selected provider is caused to remunerate the entity owning or operating the server 30. Thus, advertising space 51 may be sold in a TV setup screen to cable companies or other service providers promoting premium content such as subscribing to HBO. Further, in the service provider selection screen, competing service providers may be permitted to present advertisements promoting new-subscriber specials.

In the example shown in FIG. 4, if OTA is selected at decision diamond 54 in FIG. 3, auto programming can be executed at block 40 in some embodiments if desired. On the other hand, if one of the service providers is selected at decision diamond 54, the selection is sent from the TV 12 to the server 30 and at block 56 the server 30 returns to the TV 12 the channel map associated with the selected provider in the user's area. The channel map is loaded into the TV memory 16 by, e.g., populating a (previously empty) channel list in the TV with the channel map data, for use thereof in accordance with channel map principles known in the art. The user can thus begin to immediately use the TV 12 to view TV programming. If desired, the server 30 may maintain a record of each unique TV identification (e.g., the TV's Internet address, or TV serial number with model identification) along with the channel map that was downloaded to it and the time of download to facilitate update operations described further below.

In some implementations the user may be given option to override the downloaded channel map at anytime by manually selecting autoprogram by, e.g., selecting an autoprogram selector element 57 shown in FIG. 3.

Also, a channel map update feature may be provided. In the example embodiment shown in FIG. 5, this may be done when the user, after initial channel map programming described above, subsequently enters a setup mode at block 58 to cause the TV processor 14 to present the channel map update GUI shown in FIG. 6. As shown, in addition to selecting various other features, a "channel map update" entry may be presented on the GUI and if selected by the user, causes the TV 12 to send an "update" command to the server 30 at block 62. The command is received at block 64. Recall that the server 30 may maintain a record of the channel map that was downloaded to the TV, so that the server 30 may determine whether the particular map has been updated since the previous map download to the TV. If so, an updated map or only updated portions of the map are downloaded to the TV at block 64.

In addition to or in lieu of the above update feature, FIG. 7 shows that at block 66, the TV may periodically request an update of the server at block 68. At block 70, the request is received and the server 30 determines whether the particular map of the TV 12 has been updated since the previous map download to the TV. If so, an updated map or only updated portions of the map are downloaded to the TV at block 72.

In addition to or in lieu of the above update features, FIG. 8 shows that at block 74, the server 30 may enter a DO operation in which at block 76 the server, whenever an update to a channel map occurs, automatically pushes the updated information to all TVs correlated in the server data medium 36 to the map being updated. In this way, when a service provider's channel map for a geographic location is updated, all TVs that received previous and now obsolete versions of the channel map receive the updated information.

While the particular DOWNLOADING TV CHANNEL MAP BASED ON LOCATION AND PROVIDER is herein shown and described in detail, it is to be understood that the subject matter which is encompassed by the present invention is limited only by the claims.

What is claimed is:
1. A TV executing logic comprising:
 presenting a prompt on a TV for a user to input information representing geographic area for which a channel map is desired into a TV;
 receiving the information at the TV;
 transmitting the information to a network server, the information being correlatable to a list of TV signal providers;
 receiving, at the TV, the list from the network server;
 presenting the list on the TV;
 receiving a user selection of a TV signal provider on the list;
 sending the user selection to the network server;
 receiving from the network server a channel map associated with both the user selection of a TV signal provider and the geographic area, and
 loading the channel map into a TV memory to populate a previously empty channel list in the TV with the channel map, for use thereof to permit a viewer to immediately use the TV to view TV programming without autoprogramming by TV, the channel map including Internet channels and broadcast TV channels, wherein the prompt for a user to input information representing geographic area is presented only upon a determination that the TV communicates with the server, and otherwise an autoprogram operation is automatically executed.

2. The TV of claim 1, wherein the logic executed by the TV comprises receiving an update to the channel map.

3. The TV of claim 1, wherein the logic executed by the TV includes allowing a user of the TV to interrupt a process of receiving a channel map from a server and cause an autoprogram operation to be executed.

4. The TV of claim 2, wherein the update is received in response to an update command entered into the TV and sent to the server.

5. The TV of claim 2, wherein the update is received in response to an automatically generated update query sent from the TV to the server.

6. The TV of claim 2, wherein the update is received automatically by the TV from the server without an update query or update command being sent from the TV to the server.

7. A Network server executing logic comprising:
receiving from a TV over a network a location of the TV;
downloading a channel map based at least in part on the location; and
subsequently providing updated channel map information to the TV wherein the server sends a signal to the TV indicating that the server communicates with the TV, the TV, responsive to the signal from the server, presenting a prompt for a user to input the geographic location, the TV otherwise automatically executing an autoprogram operation.

8. The server of claim 7, wherein the logic executed by the server further comprises:
correlating the location of the TV to a list of TV service providers for the location;
transmitting the list to the TV;
receiving a user selection of a service provider on the list, the channel map being associated with the service provider selected by the user.

9. The server of claim 7, wherein the updated channel map information is sent in response to an update command entered into the TV and sent to the server.

10. The server of claim 7, wherein the updated channel map information is sent in response to an automatically generated update query sent from the TV to the server.

11. The server of claim 7, wherein the updated channel map information is sent automatically by the server to the TV without an update query or update command being sent from the TV to the server.

12. A network-enabled TV comprising:
a TV processor sending a geographic location to an Internet server and in response receiving back a list of TV service providers for the location;
a TV display controlled by the TV processor to display the list;
a user input device manipulable by a person to select a provider from the list to thereby generate a select signal, the select signal being sent from the TV to the server; and
a tangible data storage medium accessible to the processor, the processor storing on the storage medium channel map information received from the server in response to the select signal, wherein a prompt for a user to input the geographic location is presented only upon a determination that the TV communicates with the server, and otherwise an autoprogram operation automatically is executed.

13. The TV of claim 12, wherein the TV receives an update to the channel map information.

14. The TV of claim 13, wherein a user of the TV can input an interrupt command to the TV to interrupt a process of receiving a channel map from a server and cause an autoprogram operation to be executed.

15. The TV of claim 13, wherein the update is received in response to an update command entered into the TV and sent to the server.

16. The TV of claim 13, wherein the update is received in response to an automatically generated update query sent from the TV to the server.

17. The TV of claim 13, wherein the update is received automatically by the TV from the server without an update query or update command being sent from the TV to the server.

* * * * *